United States Patent [19]

Tanaka et al.

[11] Patent Number: 5,698,245

[45] Date of Patent: Dec. 16, 1997

[54] BREAD QUALITY-IMPROVING COMPOSITION AND BREAD PRODUCING PROCESS USING THE SAME

[75] Inventors: Noriaki Tanaka, Aichi, Japan; Kuniharu Nakai, Milton Keynes, England; Kenichi Takami, Aichi; Yoshiyuki Takasaki, Miyazaki, both of Japan

[73] Assignee: Amano Pharmaceutical Co., Ltd., Nagoya, Japan

[21] Appl. No.: 454,565

[22] Filed: May 30, 1995

[30] Foreign Application Priority Data

May 30, 1994 [JP] Japan ............................ HEI-6-140918

[51] Int. Cl.⁶ .................................................. A21D 2/00
[52] U.S. Cl. ................... 426/10; 426/7; 426/18; 426/19; 426/20; 426/27; 426/28; 426/549
[58] Field of Search ................... 426/10, 18, 19, 426/20, 28, 62, 7, 27, 549

[56] References Cited

U.S. PATENT DOCUMENTS 4,990,343  2/1991  Haarasilta et al. ..................... 426/10

*Primary Examiner*—Leslie Wong
*Attorney, Agent, or Firm*—Sughrue, Mion, Zinn, Macpeak & Seas, PLLC

[57] ABSTRACT

A bread quality-improving composition and a process for the production of bread using the composition. More particularly, a bread quality-improving composition which contains a maltotriose-forming enzyme or a maltotriose-forming enzyme, glucose oxidase and/or hemicellulase and a process for the production of dough and bread using the composition. The bread quality-improving composition renders possible the easy handling of dough without covering it with wheat flour and the like, the exclusion of additives for use in the control of water content, an improvement in elasticity and ductility of bread when baked, the prevention of bread solidification and other problems such as a reduction in bread volume when frozen dough is used and the elimination or reduction of emulsifying agents.

13 Claims, No Drawings

BREAD QUALITY-IMPROVING COMPOSITION AND BREAD PRODUCING PROCESS USING THE SAME

FIELD OF THE INVENTION

This invention relates to a bread quality-improving composition and a process for the production of bread using the composition. More particularly, it relates to a bread quality-improving composition which contains a maltotriose-forming enzyme (hereinafter, referred to as "G3-forming enzyme" as well) and a process for the production of bread using the composition.

BACKGROUND OF THE INVENTION

Bread is produced by mixing wheat flour with yeast, salt, sugars, oils and fats, dairy products and other auxiliary materials, kneading the mixture into a uniform mass (dough), effecting fermentation of the yeast in the dough and then baking the resulting dough. When wheat proteins in wheat flour, used as the raw material of bread, are kneaded with water, it becomes a spongy mass called gluten. It is known that gluten is mainly composed of two proteins, gliadin which provides elasticity and glutenin which provides viscosity.

Because of such properties of these proteins, carbon dioxide gas formed during the yeast fermentation can be kept in bread, its volume can be increased and a preferred product can therefore be obtained.

Yeast nutrients are generally used in order to accelerate yeast fermentation in dough. The yeast nutrients are divided into inorganic nutrient (composed of calcium sulfate which increases the hardness of water and tightens the dough, an inorganic ammonium salt that induces the yeast fermentation acceleration effect and an oxidizing agent which increases bread volume by strengthening the dough and improves its inside phase quality) and organic nutrient (blended with enzyme preparations such as α-amylase and the like).

Since the surface of the dough obtained in this manner is wet in most cases, it is desirable to make the surface dry in order to smoothly carry out the subdividing work for the subsequent bread baking. For this purpose, the dough is generally covered with wheat flour.

Also, in order to control the water content of the dough, pre-gelatinized wheat flour or pre-gelatinized starch is added in an amount of 1 to 1.5% (w/w).

In addition, bread and the like become solid with the lapse of time, thus causing deterioration of physical properties such as chewing touch and the like and therefore entailing reduction of their commercial value. Accordingly, various attempts have been made to prevent or delay such deterioration.

For example, emulsifying agents such as monoacyl glycerol, lecithin, stearyl-2-lactic acid ester and the like, saccharides such as sorbitol, sucrose and the like or oils and fats containing them, viscosity-increasing polysaccharides such as xanthan gum, pullulan and the like or α-processed starch and the like have been added at the stage of the preparation of dough. Also, a process in which maltotriose is added has been proposed (JP-A-60-192538; the term "JP-A" as used herein means an "unexamined published Japanese patent application").

In the process for the production of bread, the addition of enzymes has been examined. As mentioned above, a method in which an α-amylase is added to yeast nutrient is known. Other examples of such methods include a method in which cellulase and peroxidase are used (JP-B-4-57320; the term "JP-B" as used herein means an "examined Japanese patent publication"), a method in which pentosanase is used (JP-B-46-29180), a method in which glucose oxidase and cystine are used (JP-A-55-132300), a method in which glucose oxidase, cystine and catalase are used (JP-B-63-58534), a method in which an intermediate temperature-stable α-amylase is used (JP-A-3-155742), a method in which an acid-stable microbial α-amylase and bacterial α-amylase are used (JP-A-4-229128) and a method in which transglutaminase is used (JP-A-4-360641).

Frozen dough has been entering the limelight in recent years, namely a method in which frozen dough products produced by makers are delivered to terminal retail stores where they are finally baked, so that fresh-baked bread can be provided for consumers. In general, however, the baking of frozen dough poses problems such as a reduction in bread volume, the development of blisters on the bread surface and a reduction in the taste of the bread, hence entailing a considerable decrease in the commercial value.

Various countermeasures have been proposed with the aim of resolving such problems involved with frozen dough. For example, a method in Which a yeast-treated liquid is added to dough (JP-A-63-87933) and a method in which a refrigeration-resistant yeast is used (JP-A-63-58536) have been reported.

In any case, conventional methods cannot completely resolve these problems involved in bread making, so that development of a more effective method is still in great demand. In this connection, the aforementioned method in which maltotriose is added (JP-A-60-192538) is effective only in preventing the bread from going stale and cannot resolve the various aforementioned problems.

SUMMARY OF THE INVENTION

In view of the above, it therefore becomes an object of the present invention to provide a bread quality-improving composition which renders possible the easy handling of dough without covering it with wheat flour, the exclusion of additives for use in the control of water content, an improvement in elasticity and ductility of bread and the prevention of bread solidification and other problems, such as a reduction in bread volume when frozen dough is used.

With the aim of resolving the various aforementioned problems involved in conventional bread making, the inventors of the present invention have conducted intensive studies and found as a result that these problems can be resolved by the use of a maltotriose-forming enzyme in the bread production process. The present invention has been accomplished on the basis of this finding.

Accordingly, the present invention provides a bread quality-improving composition which contains a maltotriose-forming enzyme. Another object of the present invention is to provide a process for the production of bread in which a cereal powder is used as the main material, which comprises mixing a bread quality-improving composition that contains a maltotriose-forming enzyme with dough during the production process.

Other objects and advantages of the present invention will be made apparent as the description progresses.

DETAILED DESCRIPTION OF THE INVENTION

The term "dough" as used herein means general dough and various other types of dough such as those for rice cakes, bean-jam buns, doughnuts, pies, pizzas, hot cakes, sponge cakes, crepes and Gyoza (dumplings stuffed with minced pork), obtained by using a farinaceous powder, such as wheat flour, as the main material and mixing and kneading it with water and the like and other optional materials such as oils and fats, sugars, dairy products, eggs, yeast nutrient, enzymes, emulsifying agents and the like, in the presence or absence of yeast cultures. The term "bread" as used herein means those which are obtained by steaming, baking or frying these various types of dough. The dough and bread of the present invention also include those in which a farinaceous powder other than wheat flour, such as rye, is further blended in addition to the above materials.

The maltotriose-forming enzyme to be used in the quality-improving composition of the present invention is not particularly limited, provided that it is an enzyme capable of forming maltotriose alone or forming maltotriose as the main product from starch.

Illustrative examples of the maltotriose-forming enzyme include N-A468 enzyme produced by *Streptomyces griseus* (JP-B-57-6915; *Denpun kagaku* (Starch Science), Vol. 26, No. 3, pp. 175–181, (1979)), amylase G3 produced by *Bacillus subtilis* (JP-B-59-37957, JP-B-60-15315) and an enzyme produced by a strain belonging to the genus Microbacterium (JP-A-3-251173). In addition, AMT (trade name, manufactured by Amano Pharmaceutical Co., Ltd.) is commercially available as a maltotriose-forming enzyme. Any of these enzymes can be used in the present invention.

The quality-improving composition of the present invention can be composed of the aforementioned maltotriose-forming enzyme alone, but it generally contains not only the maltotriose-forming enzyme but also various other additives and excipients which are necessary for the production of bread.

Illustrative examples of such additives and excipients to be added to the farinaceous powder are yeast, yeast nutrient, salt, sucrose, oil and fat and the like as raw material include skimmed milk powder, egg, polysaccharides, seasoning, aromas, ascorbic acid, expanding agents (ammonium bicarbonate, sodium bicarbonate and the like), decoloring agents (ammonium persulfate and the like), emulsifying agents (sorbitan fatty acid ester, glycerol fatty acid ester, sucrose fatty acid ester and the like), calcium stearoylsulfate, L-cysteine hydrochloride, carboxymethylcellulose sodium, fruits, Coffee extract, spices and the like, which may be added in such amounts that they do not spoil the action of the maltotriose-forming enzyme.

As a matter of course, the maltotriose-forming enzyme may be used together with other enzymes such as α-amylase, cellulase, hemicellulase, glucose oxidase, catalase, transglutaminase, pentosanase, peroxidase, ascorbate oxidase, glucoamylase, lipase, mixtures thereof and the like.

Preferably, the maltotriose-forming enzyme is used in combination with glucose oxidase, with hemicellulase or with glucose oxidase and hemicellulase.

The maltotriose-forming enzyme to be used is not necessarily a high puritypreparation. Commercially available preparations can be used as the source of glucose oxidase, hemicellulase and the like. For example, GO "AMANO" II and HYDERASE 15 (both trade names) are available from Amano Pharmaceutical Co., Ltd. as glucose oxidase, and Hemicellulase "AMANO" 90 (trade name) is available from Amano Pharmaceutical Co., Ltd. as hemicellulase.

The bread quality-improving composition of the present invention containing the maltotriose-forming enzyme can be added at the time of dough preparation by any method, provided that the composition can be dispersed uniformly in the dough. For example, it may be added together with any one of the raw materials, such as wheat flour or the like, or it may be added after dissolving it in water.

The amount of the quality-improving composition to be added at the time of dough preparation may be in the range of from 0.01 to 1 unit, preferably from 0.05 to 0.5 units, as the activity of the maltotriose-forming enzyme per 1 g of wheat flour. In the same manner, glucose oxidase may be used in an amount of from 0 to 5 units, and hemicellulase in an amount of from 0 to 50 units.

It is desirable to incubate the dough for a certain period of time after addition of the quality-improving composition. That is, it is desirable to carry out an incubation step of about 30 minutes or more at 20° to 50° C., which corresponds to the fermentation step in the bread production process. By employing such an incubation step, maltotriose is continuously formed in the bread dough in which the G3-forming enzyme was added in advance. Therefore, the present invention exerts its unique effects in comparison with the case in which dough is prepared by adding maltotriose as a starting material.

After the production of dough by adding the quality-improving composition of the present invention, bread is produced in the usual way.

Examples for the freezing method of the bread dough include the method of freezing the dough after the mixing step, after the molding step, or after the final proof step. The frozen dough is used in the usual way after thawing.

In this instance, the activity of the maltotriose-forming enzyme is measured in the following manner. An appropriate amount of the enzyme is added to 0.5 ml of a 2% soluble starch solution in a 0.1M phosphate buffer (pH 7.0), the total volume of the mixture is adjusted to 1.0 ml and then the reaction is carried out at 40° C. to determine the amount of maltotriose and other reducing sugars by the Somogyi-Nelson method. One unit of enzyme is defined as the amount of enzyme which forms reducing sugar corresponding to 1 μmole of glucose per 1 minute under these conditions.

The activity of glucose oxidase is measured in the following manner. A glucose aqueous solution (10%, 0.5 ml) and a peroxidase aqueous solution (500 U/ml, 0.1 ml) are added to a 0.1M phosphate buffer (pH 7.0, 2.4 ml) in which o-dianisidine has been dissolved (6.6 mg/ml). After mixing, the mixture is preincubated at 25° C. for 5 minutes. Then, an enzyme solution (0.1 ml) is added to effect the reaction at 25° C. The change in the absorbance at 436 nm during 2 to 5 minutes after starting the reaction is observed. One unit of the enzyme is defined as the amount of enzyme which forms 1 μmole of hydrogen peroxide per 1 minute under these conditions.

The activity of hemicellulase is measured in the following manner. A 0.1N acetate buffer (pH 4.5, 3 ml) is added to a substrate aqueous solution (xylan 10 mg/ml, 1 ml). After mixing, the mixture is preincubated at 40° C. for 10 minutes. Then, an enzyme solution (1 ml) is added to effect the reaction at 40° C. of 30 minutes. After the reaction, the Somogyi's solution (2 ml) is added and the mixture is shaken and heated in boiling water for 20 minutes. After cooling, the ammonium aresenomolybdate solution (1 ml) is added, the mixture is shaken, and water is added so that the total volume becomes 25 ml. The mixture is subjected to the centrifugal separation (3,000 r.p.m., 10 minutes), and the absorbance of the supernatant at 500 nm is measured. One hundred units of the enzyme is defined as the amount of enzyme which forms reducing sugar corresponding to 1 mg of xylose per 1 minute under these conditions.

The following examples are provided to further illustrate the present invention. It is to be understood, however, that the examples are for purpose of illustration only and should not be construed as limiting the present invention. Unless otherwise indicated herein, all parts, percents, ratios and the like are by weight.

EXAMPLE 1

Effects of maltotriose-forming enzyme on bread making

Bread was prepared by a straight procedure using the following compounding formulations. In this case, 600 U/ml of AMT (trade name, manufactured by Amano Pharmaceutical Co., Ltd.) was used as the G3-forming enzyme.

| Formulation 1 | |
|---|---|
| Wheat Flour | 90 parts |
| Rye Flour | 10 parts |
| Water | 59 parts |
| Yeast | 2 parts |
| Ascorbic Acid | 0.006 part |
| Sucrose | 2 parts |
| Sodium Chloride | 2 parts |
| Shortening | 2 parts |
| Yeast Nutrient | 0.1 part |
| G3-forining Enzyme | 0.01 part |

Formulation 2 The same as formulation 1 except that the amount of the G3-forming enzyme was changed to 0.05 parts.

Formulation 3 The same as formulation 1 except that the G3-forming enzyme was not added.
Production steps (1) Mixing: "low speed, 3 minutes"→"high speed, 2 minutes"→"shortening addition"→"low speed, 1 minute"→"high speed, n minutes" (n: changes from 2 to 8 minutes depending on the condition of dough)

(2) Kneading temperature: 26° to 27° C.

(3) Fermentation: 27° to 29° C., 2 hours (4) Division: dough weight, 450 g (5) Bench: 30 to 50 minutes (6) Final Proof: 50 to 60 minutes at 38° C.

(7) Baking: 200° to 220° C., 20 to 25 minutes

One loaf of bread was produced under the above conditions to examine the resulting dough and bread. As another sample, after molding, the dough was frozen, stored at −20° C. for one week, thawed, subjected to the final proof at 38° C., and then baked in the same manner, and the resulting bread was evaluated. The volume was measured by the rape seed replacement method. Other evaluations were carried out by the artisan having five-year experience in the bread production (the evaluations in the following Examples were carried out in the same manner). The results are shown in Table 1.

TABLE 1

| Evaluation of dough | Formulation |
|---|---|
| Surface (degree of dryness) | 2 > 1 >> 3 |
| Stretching capacity | 2 > 1 > 3 |
| Workability of dough preparation | 2 > 1 >> 3 |
| Evaluation of bread | — |
| Volume | 2 > 1 > 3 |
| Elasticity | |

TABLE 1-continued

| Evaluation of dough | Formulation |
|---|---|
| 0 day | 2 > 1 > 3 |
| 7 days | 2 ≧ 1 >> 3 |
| Coloring | 2 > 1 > 3 |
| Sectility with knife | 2 > 1 > 3 |
| Evaluation of bread (from frozen dough) | — |
| Volume | 2 > 1 >> 3 |
| Elasticity | |
| 0 day | 2 > 1 >> 3 |
| 7 days | 2 > 1 >> 3 |
| Coloring | 2 > 1 > 3 |
| Sectility with knife | 2 > 1 > 3 |

The dough and bread to which the maltotriose-forming enzyme has been added were excellent in all evaluated items in comparison with those samples to which the enzyme was not added. Especially, the dough surface was evidently dry in comparison with that of formulation 3, thus showing good workability.

Due to the addition of the maltotriose-forming enzyme to wheat flour, the α-1,4-bonding in the wheat flour starch is cleaved, and maltotriose is formed as the predominant product due to the cleavage. Other substances (composed of 3 or more glucose molecules or of 2 or less glucose molecules) are also formed by this reaction. Thus, maltotriose and also a small amount of glucose is formed which is an excellent nutrient source for yeast. In other words, since a substance fermentable for yeast is abundantly supplied, the fermentation reaction proceeds quickly.

Also, gluten matrix-bonded starch (glycoprotein) is partially degraded to form fine pores in the gluten structure, thus improving the stretching capacity of the dough.

In addition, since the thus formed maltotriose has a strong ability to bind to water, it acts advantageously when the dough is frozen. That is, since water in the dough is absorbed, formation of ice crystals which cause destruction of the gluten matrix is inhibited, so that the volume of the resulting bread is not spoiled.

EXAMPLE 2

Effects of maltotriose-forming enzyme, glucose oxidase and hemicellulase on bread making (1)

Bread was prepared by a straight procedure using the following compounding formulations. In this case, 600 U/ml of AMT (trade name, manufactured by Amano Pharmaceutical Co., Ltd.) was used as the G3-forming enzyme, 1,500 U/g of Hyderase 15 (trade name, manufactured by Amano Pharmaceutical Co., Ltd.) was used as glucose oxidase and 90,000 U/g of Hemicellulase "AMANO" 90 (trade name, manufactured by Amano Pharmaceutical Co., Ltd.) was used as hemicellulase.

| Formulation 1 | |
|---|---|
| Wheat Flour | 100 parts |
| Water | 59 parts |
| Yeast | 5 parts |
| Sodium Chloride | 2 parts |
| Yeast Nutrient | 0.1 part |
| Sucrose | 2 parts |
| Shorteninq | 2 parts |
| Ascorbic Acid | 0.006 part |

-continued

| Formulation 1 | |
|---|---|
| Glucose Oxidase | 0.015 part |
| Hemicellulase | 0.01 part |
| G3-Forming Enzyme | 0.015 part |

Formulation 2 The same as formulation 1 except that the G3-forming enzyme was not added.

Formulation 3 The same as formulation 1 except that the G3-forming enzyme and glucose oxidase were not added.

Formulation 4 The same as formulation 1 except that the G3-forming enzyme and hemicellulase were not added.

Formulation 5 The same as formulation 1 except that hemicellulase was not added.

Formulation 6 The same as-formulation 1 except that glucose oxidase was not added.

Formulation 7 The same as formulation 1 except that the G3-forming enzyme, glucose oxidase and hemicellulase were not added.

Formulation 8 The same as formulation 1 except that the glucose oxidase and hemicellulase were not added.

Such combinations of enzymes are summarized in Table 2.

TABLE 2

| Formulation | G3-forming enzyme | Glucose oxidase | Hemicellulase |
|---|---|---|---|
| Formulation 1 | o | o | o |
| Formulation 2 | — | o | o |
| Formulation 3 | — | — | o |
| Formulation 4 | — | o | — |
| Formulation 5 | o | o | — |
| Formulation 6 | o | — | o |
| Formulation 7 | — | — | — |
| Formulation 8 | o | — | — |

Bread samples were produced in accordance with the production steps of Example 1. The results are shown in Table 3.

TABLE 3

| Evaluation of dough | Formulation |
|---|---|
| Surface (degree of dryness) | 1 = 5 = 6 = 8 > 2 = 3 = 4 = 7 |
| Stretching capacity | 1 = 5 > 6 > 8 > 4 > 2 > 3 > 7 |
| Workability of dough preparation | 1 = 5 = 6 = 8 ≧ 2 > 3 > 4 > 7 |
| Evaluation of bread | — |
| Volume | 1 > 5 = 6 ≧ 8 > 2 > 3 > 4 > 7 |
| Elasticity | |
| 0 day | 1 > 6 > 5 > 2 = 8 > 3 = 4 > 7 |
| 7 days | 1 > 6 > 5 = 2 = 8 > 3 = 4 > 7 |
| Evaluation of bread (from frozen dough) | — |
| Volume | 1 > 5 = 6 = 8 > 2 > 3 > 4 ≫ 7 |
| Elasticity | |
| 0 day | 1 > 6 ≧ 5 > 2 = 8 > 3 = 4 > 7 |
| 7 days | 1 > 6 > 5 = 8 ≧ 2 > 3 = 4 > 7 |

As is evident from Table 3, excellent improvement of dough and excellent evaluation results of bread were obtained by the joint use of the G3-forming enzyme with glucose oxidase and hemicellulase, in comparison with the case of the single use of the G3-forming enzyme.

Good results were also obtained by the combination of the G3-forming enzyme with glucose oxidase or hemicellulase.

Glucose oxidase is an enzyme which catalyzes a reaction in which hydrogen peroxide and gluconic acid are formed from glucose, water and oxygen. The effect of glucose oxidase on the bread making is obtained by the generation of hydrogen peroxide which is a strong oxidizing agent. Since one of the functions of hydrogen peroxide is oxidation of glutathione, the disulfide bonds do not undergo reduction by glutathione and are therefore not cleaved. It has another function in the oxidation of already reduced disulfide bonds (thiol), by converting thiol back into disulfide bonds. In addition to these functions, it seems that hydrogen peroxide also oxidizes other components in the dough to exhibit additional effects on rheology. As is evident from the mechanism of the thus formed hydrogen peroxide, tensile resistance of the dough increases and gluten is strengthened by the addition of glucose oxidase.

Since hydrogen peroxide has strong oxidative functions and should not be present in food, it is important that hydrogen peroxide be undetectable by the time the reaction is complete. Secure removal of hydrogen peroxide may be effected by its decomposition by an enzyme (peroxidase or catalase) which is present in natural wheat flour or by catalase contaminated in the enzyme mixture. In any case, being labile to heat, hydrogen peroxide is decomposed at the time of baking the bread.

Wheat flour contains soluble and insoluble hemicellulose (namely pentosan). Since solubility of pentosan exerts influence upon the rheology of dough, hemicellulase also exerts great influence upon the dough. Insoluble pentosan exerts stronger influence upon the stretching capacity of dough. Since soluble pentosan has a strong ability to bind to water, it is useful in keeping the baked bread fresh for a prolonged period of time.

When glucose, which is a nutrient source of yeast, is formed by the addition of the maltotriose-forming enzyme, carbon dioxide is generated in a large quantity as the result. In order to keep the thus formed carbon dioxide efficiently inside the dough, the aforementioned effects of glucose oxidase lead to more excellent results. In addition, the formed glucose becomes the substrate of glucose oxidase and therefore is effective in enhancing the generation of hydrogen peroxide.

EXAMPLE 3

Effects of maltotriose-forming enzyme, glucose oxidase and hemicellulase on bread making (2)

Bread was prepared in accordance with the process of Example 2 using the following compounding formulations.

| Formulation 1 | |
|---|---|
| Wheat Flour | 100 parts |
| Water | 59 parts |
| Yeast | 5 parts |
| Sodium Chloride | 2 parts |
| Yeast Nutrient | 0.1 part |
| Sucrose | 2 parts |
| Shortening | 2 parts |
| Ascorbic Acid | 0.006 part |
| Glucose Oxidase | 0.015 part |
| Hemicellulase | 0.01 part |
| G3-forming Enzyme | 0.015 part |

Formulation 2 The same as formulation 1 except that 0.5 parts of an emulsifying agent (monoglyceride) were used instead of glucose oxidase, hemicellulase and the G3-forming enzyme.

The results are shown in Table 4.

TABLE 4

| Evaluation fo dough | Formulation |
| --- | --- |
| Surface (degree of dryness) | 1 > 2 |
| Stretching capacity | 1 > 2 |
| Workability of dough preparation | 1 > 2 |
| Evaluation of bread | — |
| Volume | 1 ≧ 2 |
| Elasticity  0 day | 1 ≧ 2 |
| 7 days | 1 ≧ 2 |
| Coloring | 1 > 2 |
| Sectility with knife | 1 ≧ 2 |
| Evaluation of bread (from frozen dough) | — |
| Volume | 1 ≧ 2 |
| Elasticity  0 day | 1 ≧ 2 |
| 7 days | 1 ≧ 2 |
| Coloring | 1 > 2 |
| Sectility with knife | 1 ≧ 2 |

As is evident from Table 4, the effects of using enzymes are similar to or higher than those of the emulsifying agent. In other words, high quality bread can be produced without using emulsifying agents when the enzyme composition of the present invention is employed. Since the enzyme-based additive is a natural material, it can respond to the consumer's demand for natural foods.

EXAMPLE 4

Production of French bread

French bread was prepared by the following compounding formulation and procedure.

| Formulation | |
| --- | --- |
| Wheat Flour | 100 parts |
| Water | 59 parts |
| Yeast | 5 parts |
| Sodium Chloride | 2 parts |
| Ascorbic Acid | 0.006 part |
| G3-forming Enzyme | 0.015 part |

Production steps (1) Mixing: "low speed, 4 minutes"→"middle speed, 4 minutes"

(2) Kneading temperature: 25° C.

(3) Fermentation: 26° C., 90 minutes, 1 punch (4) Bench: 30 to 50 minutes (5) Final Proof: 90 minutes at 28° C.

(6) Baking: 240° C., 35 minutes

When the thus baked French bread was stored at ordinary temperature for 1 week, the crumb was soft without dryness or crumbling while the crust was crisp.

EXAMPLE 5

Production of sponge cake

Sponge cake was produced by the following compounding formulation and procedure.

| Formulation | |
| --- | --- |
| Superior White Sugar | 105 parts |
| Ultra-soft Flour | 100 parts |
| Dextran | 5 parts |
| Whole Egg | 175 parts |
| Oil and Fat for Sponge Use | 28 parts |
| Skimmed Milk Powder | 4 parts |
| Expanding Agent | 1.4 parts |
| G3-forming Enzyme | 0.015 part |

Production procedure

Raw materials of the above formulation were mixed and stirred to adjust the specific gravity of the mixture to 0.5. This was flattened to a thickness of 10 mm and baked at 180° C. for 15 minutes to adjust its water content to 15%.

Together with an oxygen scavenger, the thus baked sponge cake was sealed in an aluminum package and stored at 5° C. for 2 months. This product was moist and delicious even after storage.

EXAMPLE 6

Production of bread using *Bacillus subtilis* G3-forming enzyme

When bread was produced in the same manner as described in Example 1 using a G3-forming enzyme prepared in accordance with the method disclosed in JP-B-59-37957 and JP-B-60-15315, the results of its evaluation were similar to the case of using AMT.

Thus, it is apparent that the present invention renders possible easy handling of dough without covering it with wheat flour and the like, exclusion of additives for use in the control of water content, improvement of elasticity and ductility of bread when baked, prevention of bread solidification and other problems such as reduction of bread volume when frozen dough is used and elimination or reduction of emulsifying agents.

While the invention has been described in detail and with reference to specific examples thereof, it will be apparent to one skilled in the art that various changes and modifications can be made therein without departing from the spirit and scope thereof.

What is claimed is:

1. A quality-improved bread composition comprising an effective amount of:

(a) a maltotriose-forming enzyme that forms maltotriose alone or as the main product from starch, and (b) a bread dough.

2. The quality-improved bread composition according to claim 1, further comprising at least one of glucose oxidase and hemicellulase.

3. The quality-improved bread composition according to claim 1, further comprising at least one of α-amylase, cellulase, catalase, transglutaminase, pentosanase, peroxidase, ascorbate oxidase, glucoamylase and lipase.

4. The quality-improved bread composition according to claim 1, 2, or 3, wherein said bread dough is frozen bread dough.

5. The quality-improved bread composition according to claim 1, 2, or 3, wherein said bread dough comprises a farinaceous powder and water.

6. The quality-improved bread composition according to claim 5, wherein said bread dough further comprises at least one member selected from the group consisting of oil and fat, sugar, salt, aromas, a dairy product, eggs, a yeast nutrient, enzymes, an emulsifying agent, ascorbic acid, an expanding agent, calcium stearoylsulfate, L-cysteine hydrochloride, carboxymethylcellulose sodium, fruit, coffee extract and spices.

7. The quality-improved bread composition according to claim 1, wherein the maltotriose-forming enzyme is used in an amount of 0.01 to 1 unit as the activity of the maltotriose-forming enzyme per 1 gram of a farinaceous powder.

8. A process for producing bread comprising the step of mixing an effective amount of:

(a) a maltotriose-forming enzyme that forms maltotriose alone or as the main product from starch, and (b) bread dough during a production process.

9. The process for producing bread according to claim 8, wherein the maltotriose-forming enzyme and bread dough are mixed with at least one of glucose oxidase and hemicellulase.

10. The process for producing bread according to claim 8, wherein the maltotriose-forming enzyme and bread dough are mixed with at least one of α-amylase, cellulase, catalase, transglutaminase, pentosanase, peroxidase, ascorbate oxidase, glucoamylase and lipase.

11. The process for producing bread according to claim 8, 9, or 10, wherein the maltotriose-forming enzyme is used in an amount of 0.01 to 1 unit as the activity of the maltotriose-forming enzyme per 1 gram of a farinaceous powder.

12. The process for producing bread according to claim 8, 9, or 10, wherein said bread dough comprises farinaceous powder and water.

13. The process for producing bread according to claim 12, wherein said bread dough further comprises at least one member selected from the group consisting of oil and fat, sugar, salt, aromas, a dairy product, eggs, a yeast nutrient, enzymes, an emulsifying agent, ascorbic acid, an expanding agent, calcium stearoylsulfate, L-cysteine hydrochloride, carboxymethylcellulose sodium, fruit, coffee extract and spices.

\* \* \* \* \*